United States Patent
Ichikawa

(10) Patent No.: US 9,952,416 B2
(45) Date of Patent: Apr. 24, 2018

(54) IMAGING OPTICAL SYSTEM AND OPTICAL APPARATUS INCLUDING THE SAME

(71) Applicant: OLYMPUS CORPORATION, Hachioji-shi, Tokyo (JP)

(72) Inventor: Keisuke Ichikawa, Tama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/391,918

(22) Filed: Dec. 28, 2016

(65) Prior Publication Data
US 2017/0108673 A1 Apr. 20, 2017

Related U.S. Application Data

(63) Continuation of application No. PCT/JP2015/059055, filed on Mar. 25, 2015.

(30) Foreign Application Priority Data

Aug. 5, 2014 (JP) .................................. 2014-159875

(51) Int. Cl.
G02B 13/18 (2006.01)
G02B 9/60 (2006.01)
(Continued)

(52) U.S. Cl.
CPC .............. *G02B 13/18* (2013.01); *G02B 5/005* (2013.01); *G02B 9/60* (2013.01); *G02B 27/0025* (2013.01);
(Continued)

(58) Field of Classification Search
CPC .. G02B 13/0045; G02B 9/60; G02B 27/0025; G02B 13/18; G02B 5/005; G02B 13/04; G02B 13/002; G02B 3/04
(Continued)

(56) References Cited

U.S. PATENT DOCUMENTS 6,480,340 B1 * 11/2002 Yamamoto ........... G02B 15/177
359/676
7,586,690 B2 * 9/2009 Yamada ............... G02B 15/177
359/676
(Continued)

FOREIGN PATENT DOCUMENTS

JP 2004101880 A 4/2004
JP 2009109723 A 5/2009
(Continued)

OTHER PUBLICATIONS

International Preliminary Report on Patentability (IPRP) including Written Opinion (and English translation thereof) dated Feb. 16, 2017, issued in counterpart International Application No. PCT/JP2015/059055.
(Continued)

*Primary Examiner* — Evelyn A Lester
(74) *Attorney, Agent, or Firm* — Holtz, Holtz & Volek PC

(57) ABSTRACT

An imaging optical system includes a first lens unit having a negative refractive power, a second lens unit having a positive refractive power, a third lens unit having a positive refractive power, a fourth lens unit, and a fifth lens unit, and the first lens unit includes a first negative lens and a first cemented lens, the second lens unit includes a second cemented lens and one or more positive lens components, the third lens unit includes one or more positive lens components and a third cemented lens, and the first cemented lens includes a negative lens closest to the reduction side and has a concave surface facing the reduction side, the second cemented lens has a positive refractive power and has a concave surface facing the enlargement side, the third cemented lens has a positive refractive power and has a negative lens on the reduction side.

20 Claims, 7 Drawing Sheets

(51) Int. Cl.
- *G02B 27/00* (2006.01)
- *G02B 5/00* (2006.01)
- *H04N 5/225* (2006.01)
- *H04N 5/232* (2006.01)
- *G02B 13/00* (2006.01)
- *G02B 3/04* (2006.01)
- *G02B 13/04* (2006.01)

(52) U.S. Cl.
CPC .............. *G02B 3/04* (2013.01); *G02B 13/002* (2013.01); *G02B 13/0045* (2013.01); *G02B 13/04* (2013.01); *H04N 5/2254* (2013.01); *H04N 5/23293* (2013.01)

(58) Field of Classification Search
USPC .................. 359/714, 740, 753, 763, 770
See application file for complete search history.

(56) References Cited

U.S. PATENT DOCUMENTS

| | | | | |
|---|---|---|---|---|
| 8,976,455 B2* | 3/2015 | Nagahara | ............ | G02B 15/177 359/649 |
| 9,429,741 B2* | 8/2016 | Takahashi | ............ | G02B 15/177 |
| 2008/0137216 A1* | 6/2008 | Nagatoshi | ............ | G02B 13/22 359/714 |
| 2008/0247049 A1* | 10/2008 | Inoko | ................ | G02B 15/177 359/649 |
| 2009/0109551 A1 | 4/2009 | Hatada | | |
| 2010/0033848 A1 | 2/2010 | Hatada | | |
| 2011/0090574 A1 | 4/2011 | Harada et al. | | |
| 2011/0164324 A1* | 7/2011 | Okumura | ............... | G02B 13/06 359/682 |
| 2011/0304921 A1* | 12/2011 | Nagahara | ............. | G02B 15/177 359/680 |
| 2011/0304922 A1* | 12/2011 | Ichimura | .............. | G02B 15/177 359/682 |
| 2011/0317282 A1 | 12/2011 | Kimura | | |
| 2012/0069440 A1 | 3/2012 | Harada et al. | | |
| 2012/0127594 A1 | 5/2012 | Yamamoto et al. | | |
| 2012/0257100 A1 | 10/2012 | Imaoka et al. | | |
| 2013/0063648 A1* | 3/2013 | Koga | ....................... | G02B 9/64 359/793 |
| 2013/0265653 A1 | 10/2013 | Kimura | | |
| 2013/0293767 A1 | 11/2013 | Imaoka et al. | | |

FOREIGN PATENT DOCUMENTS

| | | |
|---|---|---|
| JP | 2010039340 A | 2/2010 |
| JP | 2010097207 A | 4/2010 |
| JP | 2011059290 A | 3/2011 |
| JP | 2012027451 A | 2/2012 |
| JP | 2012083703 A | 4/2012 |
| JP | 2012226309 A | 11/2012 |
| JP | 2013007954 A | 1/2013 |
| JP | 2013083781 A | 5/2013 |
| JP | 2014048488 A | 3/2014 |

OTHER PUBLICATIONS

International Search Report (ISR) and Written Opinion dated Jun. 23, 2015 issued in International Application No. PCT/JP2015/059055.

* cited by examiner 435.84 —·—·—
656.27 ------
587.56 ———

SA          AS          DT          CC
FNO 1.410   ω 24.39     ω 24.39     ω 24.39

-0.25    0.25  -0.25    0.25  -15.00   15.00  -0.02    0.02
      (mm)          (mm)          (%)          (mm)

IMAGING OPTICAL SYSTEM AND OPTICAL APPARATUS INCLUDING THE SAME

CROSS-REFERENCE TO RELATED APPLICATION

The present application is a continuation application of PCT/JP2015/059055 filed on Mar. 25, 2015 which is based upon and claims the benefit of priority from Japanese Patent Application No. 2014-159875 filed on Aug. 5, 2014; the entire contents of which are incorporated herein by reference.

BACKGROUND OF THE INVENTION

Field of the Invention

The present invention relates to an imaging optical system and an optical apparatus including the same.

Description of the Related Art

Photographic lenses having angle of views from about 60° to about 50° include wide-angle lenses and standard lenses (hereinafter referred to as "wide-angle photographic lenses"). For optical systems with wide-angle photographic lenses, conventionally, retrofocus-type optical systems or Gauss-type optical systems have been widely used.

The retrofocus-type optical system is constructed with a front unit having a negative refractive power and a rear unit having a positive refractive power. The retrofocus-type optical system is characterized in that it can ensure a sufficiently long back focus.

On the other hand, the Gauss-type optical system has a characteristic pair of cemented lenses. One of the cemented lenses has a negative lens closest to the image side and has a surface closest to the image having a concave surface facing the image side. The other cemented lens has a surface closest to the object having a concave surface facing the object side.

When the Gauss-type optical system is divided into two units, it can be divided into a unit on the object side from one cemented lens (hereinafter referred to as "object-side unit") and a unit on the image side from the other cemented lens (hereinafter referred to as "image-side unit").

In the Gauss-type optical system, the center of refractive power is closer to the image side of the optical system. That is, in the Gauss-type optical system, the refractive power of the object-side unit and the refractive power of the image-side unit are both positive refractive power, but the refractive power is larger in the image-side unit than in the object-side unit.

In conventional optical systems with wide-angle photographic lenses, the tendency for the refractive power arrangement to be asymmetric becomes stronger with increase in angle of view. Therefore, in conventional optical systems with wide-angle photographic lenses, coma, astigmatism, and chromatic aberration of magnification are more likely to deteriorate with increase in angle of view. The refractive power arrangement refers to how positive refractive power and negative refractive power are arranged.

Moreover, in conventional optical systems with wide-angle photographic lenses, the curvature of the lens surface becomes relatively larger with decrease in F-number. Therefore, in conventional optical systems with wide-angle photographic lenses, spherical aberration, coma, and longitudinal chromatic aberration tend to occur more frequently with decrease in F-number.

Moreover, in conventional optical systems with wide-angle photographic lenses, the effective aperture of the rear unit having a positive refractive power tends to increase in size.

A variety of wide-angle photographic lenses have been proposed. In the proposed wide-angle photographic lenses, the F-number is about 1.4. Examples of the optical system with a wide-angle photographic lens having a wide angle of view and a small F-number include the optical systems disclosed in Japanese Patent Application Laid-open Nos. 2012-226309, 2004-101880, 2009-109723, 2010-039340, 2010-097207, and 2011-059290.

SUMMARY OF THE INVENTION

An imaging optical system of the present invention is an imaging optical system configured to form a conjugate relation between a conjugate point on an enlargement side having a long distance and a conjugate point on a reduction side having a short distance, the imaging optical system comprises:
in order from the enlargement side,
a first lens unit having a negative refractive power;
a second lens unit having a positive refractive power;
a third lens unit having a positive refractive power;
a fourth lens unit; and
a fifth lens unit,
wherein
an aperture stop is included in the second lens unit,
the first lens unit includes a first negative lens positioned closest to the enlargement side and a first cemented lens positioned closest to the reduction side,
the second lens unit includes, in order from the enlargement side, a second cemented lens and at least one positive lens component,
the third lens unit includes, in order from the enlargement side, at least one positive lens component and a third cemented lens,
the lens component is a lens block in which an enlargement-side surface and a reduction-side surface alone are in contact with air in an optical path,
the first cemented lens includes a negative lens closest to the reduction side and has a surface closest to the reduction side having a concave surface facing the reduction side,
the second cemented lens has a positive refractive power and has a surface closest to the enlargement side having a concave surface facing the enlargement side, and
the third cemented lens includes a positive refractive power and has a negative lens on the reduction side.

Furthermore, an optical apparatus of the present invention comprises:
an optical system; and
an image pickup element disposed on the reduction side,
wherein
the image pickup element has an image pickup surface and converts an image formed on the image pickup surface by the optical system into an electrical signal, and
the optical system is the aforementioned imaging optical system.

Furthermore, an optical apparatus of the present invention comprises:
an optical system; and
a display element disposed on the reduction side,
wherein
the display element has a display surface,
an image displayed on the display surface is projected toward the enlargement side by the optical system, and the optical system is the aforementioned imaging optical system.

DETAILED DESCRIPTION OF THE PREFERRED EMBODIMENTS

Figure 1A:
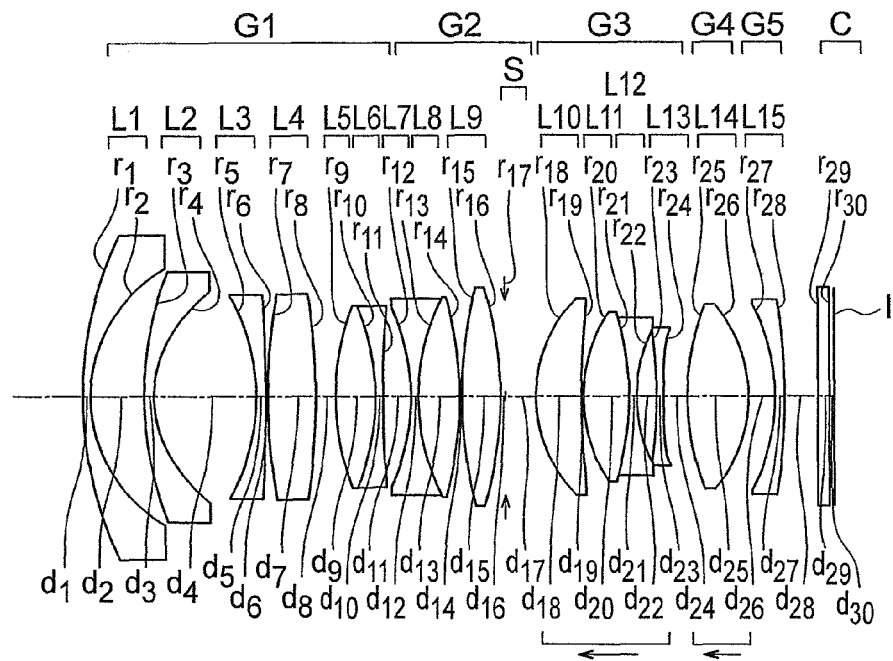
FIG. 1A is a sectional view of an imaging optical system of Example 1 and FIG. 1B, FIG. 1C, FIG. 1D and FIG. 1E are aberration diagrams of then imaging optical system of Example

Embodiments and examples of an imaging optical system and an optical apparatus including the same according to the present invention will be described in detail below based on the drawings. It is noted that the present invention is not limited by those embodiments and examples.

An imaging optical system of the present embodiment is an imaging optical system configured to form a conjugate relation between a conjugate point on an enlargement side having a long distance and a conjugate point on a reduction side having a short distance, the imaging optical system includes, in order from the enlargement side, a first lens unit having a negative refractive power, a second lens unit having a positive refractive power, a third lens unit having a positive refractive power, a fourth lens unit, and a fifth lens unit, and an aperture stop is included in the second lens unit, and the first lens unit includes a first negative lens positioned closest to the enlargement side and a first cemented lens positioned closest to the reduction side, the second lens unit includes, in order from the enlargement side, a second cemented lens and one or more positive lens components, the third lens unit includes, in order from the enlargement side, one or more positive lens components and a third cemented lens, and the lens component is a lens block in which an enlargement-side surface and a reduction-side surface alone are in contact with air in an optical path, and the first cemented lens includes a negative lens closest to the reduction side and has a surface closest to the reduction side having a concave surface facing the reduction side, the second cemented lens has a positive refractive power and has a surface closest to the enlargement side having a concave surface facing the enlargement side, the third cemented includes has a positive refractive power and has a negative lens on the reduction side. The concept of the lens component includes a single lens, a cemented lens, and a hybrid lens. For example, the hybrid lens is a lens in which a transparent resin layer made of curable resin such as ultraviolet curable resin is formed directly on a processed lens surface.

In the description of the imaging optical system of the present embodiment, a description is made using a predetermined lens unit. The predetermined lens unit has a negative refractive power and includes all of lenses located from the lens positioned closest to the enlargement side to the first cemented lens. Thus, the predetermined lens unit corresponds to the first lens unit.

The imaging optical system of the present embodiment will be described by comparing the imaging optical system of the present embodiment with a Gauss-type optical system. In the following description, the object side corresponds to the enlargement side and the image side corresponds to the reduction side.

As described above, the Gauss-type optical system includes a characteristic pair of cemented lenses. Here, one of the cemented lenses has a negative lens closest to the image side and the surface closest to the image side has a concave surface facing the image side.

On the other hand, the imaging optical system of the present embodiment also includes a characteristic pair of cemented lenses, namely, a first cemented lens and a second cemented lens. Here, the first cemented lens has a negative lens closest to the reduction side and the surface closest to the reduction side has a concave surface facing the reduction side. Thus, the first cemented lens corresponds to the one cemented lens of the Gauss-type optical system.

Furthermore, in the Gauss-type optical system, the object-side unit includes the one cemented lens. By contrast, in the imaging optical system of the present embodiment, the predetermined lens unit includes the first cemented lens. Thus, the predetermined lens unit corresponds to the object-side unit of the Gauss-type optical system.

As described above, in the Gauss-type optical system, the refractive power is larger in the image-side unit than in the object-side unit. However, the refractive power of the object-side unit and the refractive power of the image-side unit are both positive refractive powers.

By contrast, in the imaging optical system of the present embodiment, the predetermined lens unit has a negative refractive power. When the distribution state of refractive power is compared to the Gauss-type optical system, in the imaging optical system of the present embodiment, the negative refractive power is distributed to the object-side unit.

In this way, the predetermined lens unit can be said to be an object-side unit in which refractive power is shifted from positive refractive power to negative refractive power in the Gauss-type optical system. The refractive power to be shifted may be a small positive refractive power. However, the refractive power in this case is smaller than the refractive power of the object-side unit in the Gauss-type optical system.

Furthermore, the Gauss-type optical system is an optical system having an extremely high potential in aberration correction even with an F-number of about 1.4, as long as the angle of view is up to about 50°. Such a high potential for aberration correction is based on the characteristic pair of cemented lenses.

Here, the imaging optical system of the present embodiment employs an arrangement in which a refractive power shifts in the object-side unit and an increase in positive refractive power in the image-side unit are effected in the Gauss-type optical system. Therefore, the imaging optical system of the present embodiment differs from the Gauss-type optical system.

However, the imaging optical system of the present embodiment also includes a characteristic pair of cemented lenses. Thus, the imaging optical system of the present embodiment is based on an optical system having an extremely high potential in aberration correction. Therefore, in the imaging optical system of the present embodiment, it is possible (I) to reduce the F-number, that is, to ensure sufficient brightness in the optical system while correcting various aberrations satisfactorily, (II) to reduce the focal length of the imaging optical system as a whole while ensuring a sufficiently long back focus, and (III) to ensure a sufficiently wide angle of view.

The refractive power shift in the object-side unit refers to shifting the refractive power of the object-side unit from original positive refractive power to negative refractive power in the Gauss-type optical system. Furthermore, the increase in positive refractive power in the image-side unit refers to making the positive refractive power of the image-side unit larger than the original refractive power in the Gauss-type optical system.

Furthermore, when the refractive power shift in the object-side unit is effected, the height of principal rays is significantly increased in the image-side unit. As a result, aberration in the image-side unit is deteriorated. In order to avoid this deterioration of aberration, it is preferable to move the aperture stop closer to the image side than the other cemented lens is.

As described above, also in the imaging optical system of the present embodiment, the predetermined lens unit has a negative refractive power. Then, in order to avoid deterioration of aberration in the image-side unit, it is preferable that the aperture stop is positioned closer to the reduction side than the second cemented lens is, also in the imaging optical system of the present embodiment.

As described above, the imaging optical system of the present embodiment is based on the Gauss-type optical system. Thus, the imaging optical system of the present embodiment is also an optical system having an extremely high potential in aberration correction. Based on this, even when the aperture stop is positioned closer to the reduction side than the second cemented lens is, it is possible to prevent deterioration of aberration to some extent.

However, when the aperture stop is positioned closer to the reduction side than the second cemented lens is, the position of the aperture stop relative to the characteristic pair of cemented lenses differs from that of the Gauss-type optical system. Therefore, when the aperture stop is positioned closer to the reduction side than the second cemented lens is, it is difficult to correct aberration at a higher level.

Then, in the imaging optical system of the present embodiment, a third cemented lens is newly provided. This third cemented lens has a negative lens on the reduction side. For example, by combining this negative lens with a positive lens, it is possible to allow the third cemented lens to function as an aplanatic achromatic lens.

In this way, by providing the third cemented lens in addition to the first cemented lens and the second cemented lens, it is possible to correct spherical aberration, coma, longitudinal chromatic aberration, and chromatic aberration of magnification, which are particularly difficult to correct, to a satisfactory level in the imaging optical system of the present embodiment.

As a result, with the imaging optical system of the present embodiment, it is possible to implement an imaging optical system in which various aberrations are corrected favorably while having a wide angle of view and a small F-number. The wide angle of view is, for example, an angle of view of 70° or more, and the small F-number is, for example, about 1.2.

As described above, the imaging optical system of the present embodiment is an optical system having an extremely high potential in aberration correction. In the imaging optical system of the present embodiment, this extremely high aberration correction potential is obtained by the inclusion of the following arrangement. The first lens unit has a first negative lens positioned closest to the enlargement side and a first cemented lens positioned closest to the reduction side. The second lens unit has, in order from the enlargement side, a second cemented lens and one or more positive lens components. The third lens unit has, in order from the enlargement side, one or more positive lens components and a third cemented lens.

Furthermore, in the imaging optical system of the present embodiment, the aperture stop is positioned closer to the reduction side than the second cemented lens is. Specifically, the aperture stop is arranged in the second lens unit.

Furthermore, a more specific arrangement of the imaging optical system of the present embodiment is as follows. The imaging optical system includes, in order from the enlargement side, a first lens unit having a negative refractive power, a second lens unit having a positive refractive power, a third lens unit having a positive refractive power, a fourth lens unit, and a fifth lens unit. Then, the refractive power of the first lens unit is shifted from positive refractive power in the Gauss-type optical system to negative refractive power, while the second lens unit and the third lens unit are provided with a larger positive refractive power compared with the Gauss-type optical system.

Furthermore, the first cemented lens has a negative lens closest to the reduction side and the surface closest to the reduction side has a concave surface facing the reduction side. In addition, the second cemented lens has a positive refractive power and the surface closest to the enlargement side has a concave surface facing the enlargement side. Moreover, the third cemented lens has a positive refractive power and has a negative lens on the reduction side. Furthermore, the lens component is a lens block in which the enlargement-side surface and the reduction-side surface alone are in contact with air in the optical path.

A more preferable arrangement of each cemented lens is as follows. The first cemented lens includes, in order from the enlargement side, a positive lens and a negative lens, and the surface closest to the reduction side has a concave surface facing the reduction side. The second cemented lens includes a negative lens and a positive lens, and the surface closest to the enlargement side has a concave surface facing the enlargement side. Furthermore, the third cemented lens includes, in order from the enlargement side, a positive lens and a negative lens.

Furthermore, in the imaging optical system of the present embodiment, it is preferable that following Conditional Expression (1) is satisfied:

$$0.1 < M_{5\_3G}/M_{5\_4G} < 5 \qquad (1)$$

where $M_{5\_3G}$ is a lateral magnification of the third lens unit at a time of focusing to an object at infinity; and $M_{5\_4G}$ is a lateral magnification of the fourth lens unit at the time of focusing to the object at infinity.

As described above, the imaging optical system of the present embodiment employs an arrangement in which a refractive power shift in the object-side unit and an increase in positive refractive power in the image-side unit are effected in the Gauss-type optical system. Here, as a particularly unique requirement of an optical system having a large aperture ratio, there is correction at high level for spherical aberration, coma, and astigmatism.

Then, in order to achieve this aberration correction at high level, the section, closer to the reduction side than the predetermined lens unit is, is constructed with the second lens unit having a positive refractive power, the third lens unit having a positive refractive power, the fourth lens unit having a positive refractive power, and the fifth lens unit having a negative refractive power. In this way, the optical system is divided such that the lens unit closest to the reduction side has a definitely negative refractive power.

Then, the optical system as a whole has an arrangement including five lens units having a negative refractive power, a positive refractive power, a positive refractive power, a positive refractive power, and a negative refractive power. As a result, it is possible to implement an imaging optical system in which various aberrations are corrected favorably while having a wide angle of view and a small F-number.

It is then preferable that Conditional Expression (1) is satisfied in the relation between the third lens unit having a negative refractive power and the fourth lens unit having a positive refractive power.

When exceeding an upper limit value of Conditional Expression (1), it is difficult to correct each of spherical aberration, coma, and astigmatism to a satisfactory level. On the other hand, when falling below a lower limit value of Conditional Expression (1), it is difficult to ensure a back focus of a required length.

It is preferable that following Conditional Expression (1') is satisfied instead of Conditional Expression (1):

$$0.2 < M_{5\_3G}/M_{5\_4G} < 2 \quad (1').$$

Furthermore, it is more preferable that following Conditional Expression (1°') is satisfied instead of Conditional Expression (1):

$$0.4 < M_{5\_3G}/M_{5\_4G} < 1 \quad (1'').$$

Furthermore, in the imaging optical system of the present embodiment, it is preferable that following Conditional Expression (2) is satisfied:

$$-10 < (R_{2GF} + R_{2GR})/(R_{2GF} - R_{2GR}) < -0.1 \quad (2),$$

where $R_{2GF}$ is a paraxial radius of curvature of the surface positioned closest to the enlargement side in the second lens unit; and $R_{2GR}$ is a paraxial radius of curvature of the surface positioned closest to the reduction side in the second lens unit.

When a larger positive refractive power compared with the Gauss-type optical system is applied to the section closer to the reduction side than the predetermined lens unit is, it is difficult to correct spherical aberration and coma in the section closer to the reduction side than the predetermined lens unit is.

Then, the section, closer to the reduction side than the predetermined lens unit is, is constructed with four lens units from the second lens unit to the fifth lens unit. Then, the second lens unit includes, in order from the enlargement side, a second cemented lens and one or more positive lens components. In addition, it is desirable that the aperture stop is positioned closer to the reduction side than the second cemented lens is in the same manner as when the aperture stop is moved toward the image side relative to the other cemented lens in the Gauss-type optical system.

It is then preferable that Conditional Expression (2) is satisfied. By satisfying Conditional Expression (2), it is possible to prevent deterioration of axial aberration and deterioration of off-axis aberration.

When exceeding an upper limit value of Conditional Expression (2), spherical aberration and coma are more likely to be deteriorated. Thus, exceeding the upper limit value of Conditional Expression (2) is not preferable. On the other hand, when falling below a lower limit value of Conditional Expression (2), astigmatism is more likely to be deteriorated.

It is desirable that following Conditional Expression (2') is satisfied instead of Conditional Expression (2):

$$-8 < (R_{2GF} + R_{2GR})/(R_{2GF} - R_{2GR}) < -1 \quad (2').$$

Furthermore, it is more desirable that following Conditional Expression (2'') is satisfied instead of Conditional Expression (2):

$$-4.5 < (R_{2GF} + R_{2GR})/(R_{2GF} - R_{2GR}) < -3.5 \quad (2'').$$

Furthermore, in the imaging optical system of the present embodiment, it is preferable that a first positive lens positioned closest to the second cemented lens is included and following Conditional Expression (3) is satisfied:

$$0.001 < (R_{P1F} + R_{P1R})/(R_{P1F} - R_{P1R}) < 5 \quad (3),$$

where $R_{P1F}$ is a paraxial radius of curvature of the enlargement-side surface of the first positive lens; and $R_{P1R}$ is a paraxial radius of curvature of the reduction-side surface of the first positive lens.

When a larger positive refractive power compared with the Gauss-type optical system is applied to the section closer to the reduction side than the predetermined lens unit is, it is difficult to correct spherical aberration and coma in the section closer to the reduction side than the predetermined lens unit is.

Then, the section, closer to the reduction side than the predetermined lens unit is, is constructed with four lens units from the second lens unit to the fifth lens unit. Then, the second lens unit includes, in order from the enlargement side, a second cemented lens and one or more positive lens components. In addition, it is desirable that the aperture stop is positioned closer to the reduction side than the second cemented lens is in the same manner as when the aperture stop is moved toward the image side relative to the other cemented lens in the Gauss-type optical system.

It is then preferable that Conditional Expression (3) is satisfied. By satisfying Conditional Expression (3), it is possible to prevent deterioration of axial aberration and deterioration of off-axis aberration.

When exceeding an upper limit value of Conditional Expression (3), spherical aberration and coma are more likely to be deteriorated. Thus, exceeding the upper limit value of Conditional Expression (3) is not preferable. On the other hand, when falling below a lower limit value of Conditional Expression (3), astigmatism is more likely to be deteriorated.

It is desirable that following Conditional Expression (3') is satisfied instead of Conditional Expression (3):

$$0.01 < (R_{P1F} + R_{P1R})/(R_{P1F} - R_{P1R}) < 1 \quad (3').$$

Furthermore, it is more desirable that following Conditional Expression (3'') is satisfied instead of Conditional Expression (3):

$$0.05 < (R_{P1F} + R_{P1R})/(R_{P1F} - R_{P1R}) < 0.6 \quad (3'').$$

The imaging optical system of the present embodiment is derived from the Gauss-type optical system. Then, to ensure high imaging performance, a detailed arrangement is changed by changing the positive and negative signs of refractive power and the absolute value of refractive power in the object-side unit and/or the image-side unit in accordance with the specifications.

Here, the Gauss-type optical system includes the object-side unit and the image-side unit and is constructed with six lenses or seven lenses as a whole. The arrangement is represented as, for example, in order from the object side, positive•positive negative•S•negative positive•positive, or positive•positive negative•S•negative positive•positive•positive. Here, "positive" represents a positive lens, "negative" represents a negative lens, "positive negative" and "negative positive" represent a cemented lens, "S" represents an aperture stop, and "•" represents an air space. Furthermore, the optical system can be divided into the object-side unit and the image-side unit by the aperture stop S as a boundary. In another arrangement, a positive lens is additionally arranged in the image-side unit.

Furthermore, in the imaging optical system of the present embodiment, it is preferable that an air space in a range from the third lens unit to the fifth lens unit change at the time of focusing.

Aberration generally changes when focusing is performed, because the way in which light rays pass through changes in the optical system. In particular, in a case of an optical system with a large aperture ratio and having high optical performance, variations occurring on the image plane are hardly permitted for spherical aberration, coma, and astigmatism. Therefore, when inner focusing is used, the changing of the air space at the time of focusing is performed in a section with small variations of the aberrations.

In the imaging optical system of the present embodiment, the section with small variations of the aberrations is an air space in the range from the third lens unit to the fifth lens unit. Then, by changing an air space in the range from the third lens unit to the fifth lens unit at the time of focusing, it is possible to reduce variations occurring on the image plane to a permissible level for spherical aberration, coma, and astigmatism.

Furthermore, in the imaging optical system of the present embodiment, it is preferable that following Conditional Expression (4) is satisfied:

$$-8<(R_{5GF}+R_{5GR})/(R_{5GF}-R_{5GR})<-0.1 \quad (4).$$

where $R_{5GF}$ is a paraxial radius of curvature of the surface positioned closest to the enlargement side in the fifth lens unit; and $R_{5GR}$ is a paraxial radius of curvature of the surface positioned closest to the reduction side in the fifth lens unit.

The part corresponding to the image-side unit of the Gauss-type optical system, that is, the section, closer to the reduction side than the predetermined lens unit is, is constructed with four lens units in the imaging optical system of the present embodiment. Then, the refractive power arrangement is, in order from the enlargement side, positive refractive power, positive refractive power, positive refractive power, and negative refractive power. However, with such a refractive power arrangement alone, it is difficult to correct the remaining spherical aberration, coma, and astigmatism at the same time to a satisfactory level in an optical system with a large aperture ratio.

Then, by satisfying Conditional Expression (4), it is possible to correct the remaining spherical aberration, coma, and astigmatism at the same time to a satisfactory level. Conditional Expression (4) is a conditional expression for the lens unit positioned closest to the reduction side. In the imaging optical system of the present embodiment, since a lens unit positioned closest to the reduction side is the fifth lens unit, Conditional Expression (4) is the conditional expression for the fifth lens unit.

When exceeding an upper limit value of Conditional Expression (4), astigmatism is more likely to be increased. Thus, exceeding the upper limit value of Conditional Expression (4) is not preferable. On the other hand, when falling below a lower limit value of Conditional Expression (4), spherical aberration and coma are more likely to be deteriorated.

It is desirable that following Conditional Expression) (4') is satisfied instead of Conditional Expression (4):

$$-4<(R_{5GF}+R_{5GR})/(R_{5GF}-R_{5GR})<-0.5 \quad (4').$$

Furthermore, it is more desirable that following Conditional Expression (4") is satisfied instead of Conditional Expression (4):

$$-2.5<(R_{5GF}+R_{5GR})/(R_{5GF}-R_{5GR})<-1.7 \quad (4'').$$

Furthermore, in the imaging optical system of the present embodiment, it is preferable that the fourth lens unit includes one lens, the one lens is a second positive lens, and following Conditional Expression (5) is satisfied:

$$0.01<(R_{P2F}+R_{P2R})/(R_{P2F}-R_{P2R})<2 \quad (5)$$

where $R_{P2F}$ is a paraxial radius of curvature of the enlargement-side surface of the second positive lens; and $R_{P2R}$ is a paraxial radius of curvature of the reduction-side surface of the second positive lens.

The part corresponding to the image-side unit of the Gauss-type optical system, that is, the section, closer to the reduction side than the predetermined lens unit is, is constructed with four lens units in the imaging optical system of the present embodiment. Then, the refractive power arrangement is, in order from the enlargement side, positive refractive power, positive refractive power, positive refractive power, and negative refractive power. However, with such a refractive power arrangement alone, it is difficult to correct the remaining spherical aberration, coma, and astigmatism at the same time to a satisfactory level in an optical system with a large aperture ratio.

Then, by constructing the fourth lens unit with one lens and by satisfying Conditional Expression (5), it is possible to correct the remaining spherical aberration, coma, and astigmatism at the same time to a satisfactory level.

When exceeding an upper limit value of Conditional Expression (5), spherical aberration and coma are more likely to be deteriorated. On the other hand, when falling below a lower limit value of Conditional Expression (5), astigmatism is more likely to be increased. Thus, falling below the lower limit value of Conditional Expression (5) is not preferable.

It is desirable that following Conditional Expression (5') is satisfied instead of Conditional Expression (5):

$$0.1<(R_{P2F}+R_{P2R})/(R_{P2F}-R_{P2R})<1 \quad (5').$$

Furthermore, it is more desirable that following Conditional Expression (5") is satisfied instead of Conditional Expression (5):

$$0.25<(R_{P2F}+R_{P2R})/(R_{P2F}-R_{P2R})<0.5 \quad (5'').$$

Furthermore, in the imaging optical system of the present embodiment, it is preferable that the first negative lens is a meniscus lens.

As described above, in the imaging optical system of the present embodiment, a negative refractive power is imparted to the predetermined lens unit. For this, it is preferable that the lens positioned closest to the enlargement side in particular is a negative lens. However, the negative lens arranged closest to the enlargement side has a significant effect on the amount of off-axis aberration compared with a negative lens arranged at any other position. Then, by forming the negative lens into a meniscus shape, it is possible to prevent deterioration of off-axis aberration. As a result, it is possible to implement an imaging optical system in which various aberrations are corrected favorably while having a wide angle of view and a small F-number.

Furthermore, in the imaging optical system of the present embodiment, it is preferable that following Conditional Expression (6) is satisfied:

$$0.1 < (R_{N1F} + R_{N1R})/(R_{N1F} - R_{N1R}) < 6 \quad (6),$$

where $R_{N1F}$ is a paraxial radius of curvature of the enlargement-side surface of the first negative lens; and $R_{N1R}$ is a paraxial radius of curvature of the reduction-side surface of the first negative lens.

By satisfying Conditional Expression (6), it is possible to prevent deterioration of off-axis aberration.

When exceeding an upper limit value of Conditional Expression (6), astigmatism or coma is more likely to be deteriorated. On the other hand, when falling below a lower limit value of Conditional Expression (6), barrel distortion is more likely to be increased. Thus, falling below the lower limit value of Conditional Expression (6) is not preferable.

It is desirable that following Conditional Expression (6') is satisfied instead of Conditional Expression (6):

$$1 < (R_{N1F} + R_{N1R})/(R_{N1F} - R_{N1R}) < 4 \quad (6').$$

Furthermore, it is more desirable that following Conditional Expression (6") is satisfied instead of Conditional Expression (6):

$$2.15 < (R_{N1F} + R_{N1R})/(R_{N1F} - R_{N1R}) < 2.75 \quad (6'').$$

Furthermore, in the imaging optical system of the present embodiment, it is preferable that the third lens unit includes a negative lens component closer to the reduction side than the third cemented lens is, the fourth lens unit has a positive refractive power and includes a positive lens component, and the fifth lens unit has a negative refractive power and includes a negative lens component.

By constructing the imaging optical system in this way, it is possible to implement an imaging optical system in which various aberrations are corrected favorably while having a wide angle of view and a small F-number. In addition, even when the number of lenses is increased in order to improve optical performance, it is possible to ensure an appropriate principal point position. Furthermore, even when a larger positive refractive power compared with the Gauss-type optical system is applied to the section closer to the reduction side than the predetermined lens unit is, it is possible to correct spherical aberration, coma, longitudinal chromatic aberration, and chromatic aberration of magnification to a satisfactory level.

Furthermore, in the imaging optical system of the present embodiment, it is preferable that following Conditional Expression (7) is satisfied:

$$0.1 < D_{3G}/D_{4G} < 4.5 \quad (7),$$

where $D_{3G}$ is an amount of movement of the third lens unit at the time of focusing; and $D_{4G}$ is an amount of movement of the fourth lens unit at the time of focusing.

Aberration generally changes when focusing is performed, because the way in which light rays pass through changes in the optical system. In particular, in a case of an optical system with a large aperture ratio and having high optical performance, variations occurring on the image plane are hardly permitted for spherical aberration, coma, and astigmatism. Therefore, when inner focusing is used, the changing of the air space at the time of focusing is performed in a section with small variations of the aberrations.

In the imaging optical system of the present embodiment, the section with small variations of the aberrations is an air space in the range from the third lens unit to the fifth lens unit. Then, by changing an air space in the range from the third lens unit to the fifth lens unit at the time of focusing, it is possible to reduce variations occurring on the image plane to a permissible level for spherical aberration, coma, and astigmatism.

Furthermore, by satisfying Conditional Expression (7), it is possible to further reduce variations occurring on the image plane for spherical aberration, coma, and astigmatism.

When exceeding an upper limit value of Conditional Expression (7) or when falling below a lower limit value, it is difficult to reduce variations occurring on the image plane to a permissible level for spherical aberration, coma, and astigmatism.

It is desirable that following Conditional Expression (7') is satisfied instead of Conditional Expression (7):

$$0.5 < D_{3G}/D_{4G} < 3.5 \quad (7').$$

Furthermore, it is more desirable that following Conditional Expression (7") is satisfied instead of Conditional Expression (7):

$$0.7 < D_{3G}/D_{4G} < 3.2 \quad (7'').$$

Furthermore, in the imaging optical system of the present embodiment, it is preferable that the third lens unit includes, in order from the enlargement side, the positive lens component, the third cemented lens, and a negative lens component, the third cemented lens includes, in order from the enlargement side, a positive lens and the negative lens, and a shape of the negative lens component in the third lens unit is a biconcave shape.

By constructing the third lens unit in this way, it is possible to implement an imaging optical system in which various aberrations are corrected favorably while having a wide angle of view and a small F-number. In addition, even when the number of lenses is increased in order to improve optical performance, it is possible to ensure an appropriate principal point position. Furthermore, even when a larger positive refractive power compared with the Gauss-type optical system is applied to the section closer to the reduction side than the predetermined lens unit is, it is possible to correct spherical aberration, coma, longitudinal chromatic aberration, and chromatic aberration of magnification to a satisfactory level.

Furthermore, in the imaging optical system of the present embodiment, it is preferable that following Conditional Expression (A) is satisfied:

$$0 < f/e_{N1F} < 2 \quad (A),$$

where f is a focal length of the imaging optical system as a whole at the time of focusing to the object at infinity; and $e_{N1F}$ is a maximum effective aperture of the enlargement-side surface of the first negative lens.

When exceeding an upper limit value of Conditional Expression (A), it is difficult to expand the angle of view. That is, when the angle of view is to be expanded, spherical aberration, distortion, and astigmatism are more likely to occur. On the other hand, when falling below a lower limit value of Conditional Expression (A), the optical system is more likely to increase in size radially.

It is desirable that following Conditional Expression (A') is satisfied instead of Conditional Expression (A):

$$0.1 < f/e_{N1F} < 1.5 \tag{A'}$$

Furthermore, it is more desirable that following Conditional Expression (A") is satisfied instead of Conditional Expression (A):

$$0.2 < f/e_{N1F} < 1 \tag{A''}$$

Furthermore, in the imaging optical system of the present embodiment, it is preferable that following Conditional Expression (B) is satisfied:

$$0 < (f/e_{AS})/Fno < 2 \tag{B}$$

where f is the focal length of the imaging optical system as a whole at the time of focusing to the object at infinity;

$e_{AS}$ is a maximum diameter of the aperture stop;

Fno is a F-number of the imaging optical system as a whole at the time of focusing to the object at infinity.

When exceeding an upper limit value of Conditional Expression (B), it is difficult to expand the angle of view. That is, when the angle of view is to be expanded, it is difficult to correct spherical aberration and chromatic aberration. On the other hand, when falling below a lower limit value of Conditional Expression (B), the optical system is more likely to increase in size radially.

It is desirable that following Conditional Expression (B') is satisfied instead of Conditional Expression (B):

$$0.2 < (f/e_{AS})/Fno < 1 \tag{B'}$$

Furthermore, it is more desirable that following Conditional Expression (B") is satisfied instead of Conditional Expression (B):

$$0.3 < (f/e_{AS})/Fno < 0.9 \tag{B''}$$

Furthermore, in the imaging optical system of the present embodiment, it is preferable that following Conditional Expression (C) is satisfied:

$$0 < T_{air\_max}/\Sigma d \leq 0.27 \tag{C}$$

where $T_{air\_max}$ is a largest axial air space in the range from a surface positioned closest to the enlargement side to a surface positioned closest to the reduction side in the imaging optical system; and $\Sigma d$ is an axial distance from the surface positioned closest to the enlargement side to the surface positioned closest to the reduction side in the imaging optical system.

Conditional Expression (C) is a conditional expression advantageous for ensuring high optical performance, reducing the overall length of the optical system, and reducing the outer diameter of the imaging optical system.

Adequately increasing the air space between lenses leads to improvement in optical performance. However, excessively increasing $\Sigma d$, that is, the axial distance from the lens surface positioned closest to the enlargement side to the lens surface positioned closest to the reduction side in the imaging optical system, to ensure optical performance is more likely to lead to an increase in the overall length of the optical system and a larger aperture of the optical system.

Then, by satisfying Conditional Expression (C), it is advantageous for ensuring a required number of lenses for achieving high optical performance while reducing the overall length and the diameter of the optical system.

It is desirable that following Conditional Expression (C') is satisfied instead of Conditional Expression (C):

$$0.03 < T_{air\_max}/\Sigma d \leq 0.2 \tag{C'}$$

Furthermore, it is more desirable that following Conditional Expression (C") is satisfied instead of Conditional Expression (C)

$$0.07 < T_{air\_max}/\Sigma d \leq 0.16 \tag{C''}$$

Furthermore, an optical apparatus of the present embodiment includes an optical system and an image pickup element arranged on the reduction side, the image pickup element has an image pickup surface and converts an image formed on the image pickup surface by the optical system into an electrical signal, and the optical system is the aforementioned imaging optical system.

According to the optical apparatus of the present embodiment, it is possible to capture an image in a wider photography range with low noise at high resolution.

Furthermore, an optical apparatus of the present embodiment has an optical system and a display element arranged on the reduction side, the display element has a display surface, an image displayed on the display surface is projected toward the enlargement side by the optical system, and the optical system is the aforementioned imaging optical system.

According to the optical apparatus of the present embodiment, it is possible to project an image in a wider projection range with low noise at high resolution.

The imaging optical system and the optical apparatus described above may satisfy a plurality of arrangements at the same time. Doing so is preferable to obtain a favorable imaging optical system or optical apparatus. A preferable combination of arrangements is made as desired. Furthermore, in each conditional expression, only the upper limit value or the lower limit value in a more restricted numerical range of the conditional expression may be limited.

Examples of the imaging optical system will be described in detail below based on the drawings. It is noted that the present invention is not limited by those examples.

Examples 1 and 2 of the imaging optical system will be described below based on the drawings. The imaging optical systems of Examples 1 and 2 are both imaging optical systems having an F-number below 1.5.

Figure 2A:
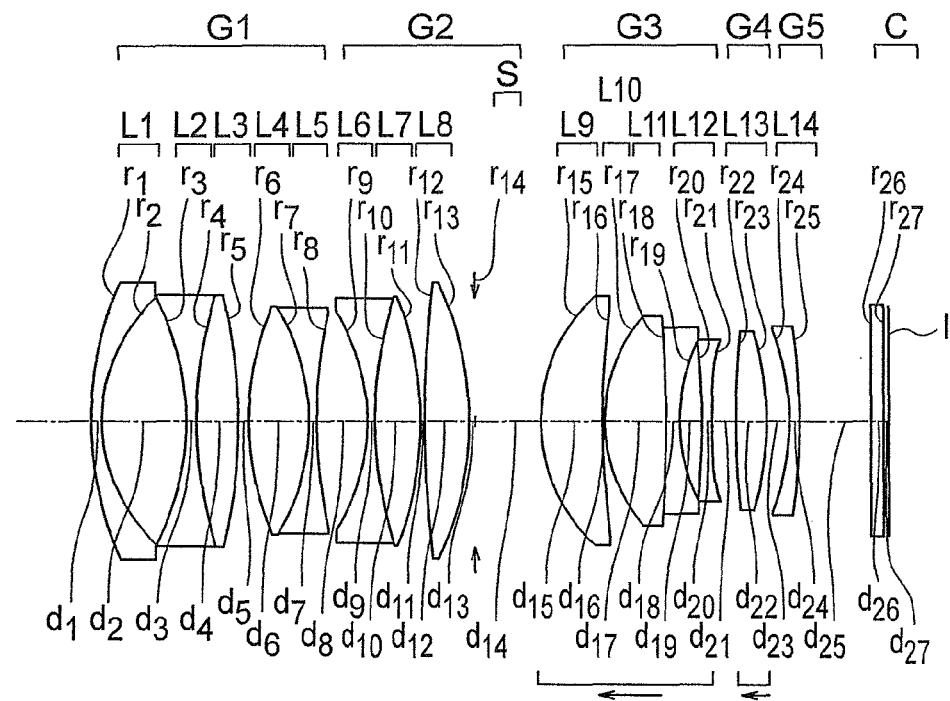
FIG. 2A is a sectional view of an imaging optical system of Example 2 and FIG. 2B, FIG. 2C, FIG. 2D and FIG. 2E are aberration diagrams of the imaging optical system of Example 2.

FIG. 1A and FIG. 2A are lens sectional views of the imaging optical systems of Examples. The lens sectional views are lens sectional views at a time of focusing to an object at infinity.

Figures 1B, 1C, 1D, 1E:
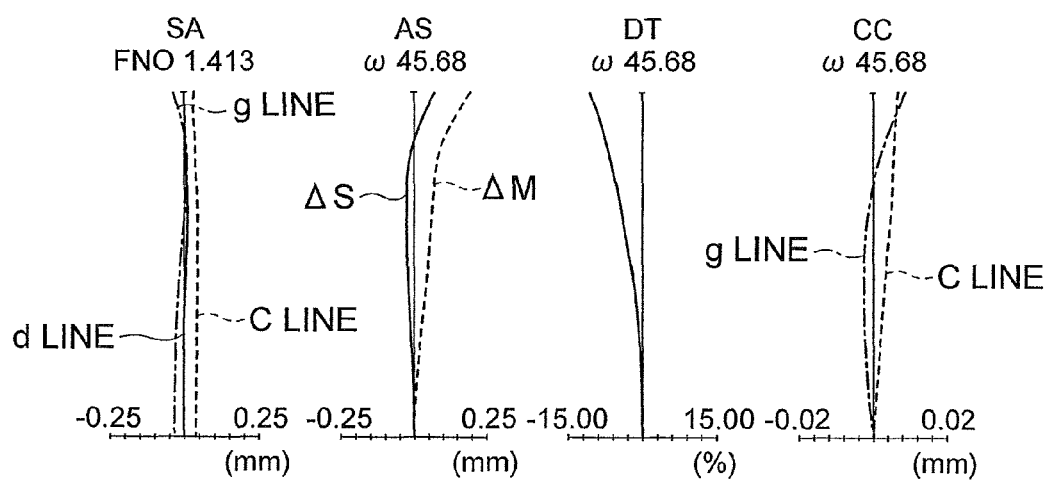
Figures 2B, 2C, 2D, 2E:
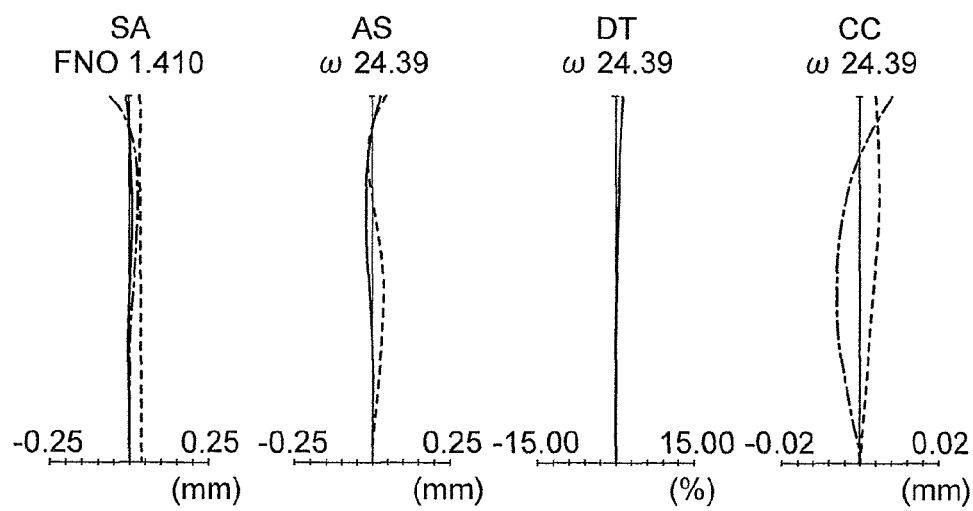

FIG. 1B and FIG. 2B illustrate spherical aberration (SA), FIG. 1C and FIG. 2C illustrate astigmatism (AS), FIG. 1D and FIG. 2D illustrate distortion (DT), and FIG. 1E and FIG. 2E illustrate chromatic aberration of magnification (CC), in the imaging optical systems of Examples. The aberration diagrams are aberration diagrams at the time of focusing to the object at infinity. Furthermore, "ω" represents a half angle of view.

Moreover, in the lens sectional views of Examples, the first lens unit is denoted by G1, the second lens unit is denoted by G2, the third lens unit is denoted by G3, the fourth lens unit is denoted by G4, the fifth lens unit is denoted by G5, a cover glass is denoted by C, and the image plane is denoted by I. The imaging optical system of each example can be divided into a front unit and a rear unit. In this case, the first lens unit G1 corresponds to the front unit, and the remaining lens units correspond to the rear unit.

Furthermore, although not shown, a plane-parallel plate that forms a low-pass filter may be arranged between the fifth lens unit G5 and the image plane I. A wavelength range limiting coat for limiting infrared light may be applied on the surface of the plane-parallel plate. A multilayer film for limiting a wavelength range may be applied on the surface of the cover glass C. In addition, the cover glass C may have a low-pass filter function.

Furthermore, when the imaging optical system is used for image capturing, an image pickup element is arranged on the image plane I. On the other hand, when the imaging optical system is used for projection, a display element is arranged on the image plane I. In the description of the arrangement in each example, it is presumed that the imaging optical system is used for image capturing. Thus, it is assumed that the enlargement side is the object side and the reduction side is the image side.

An imaging optical system according to Example 1 will be described. FIG. 1A is a lens sectional view of the imaging optical system according to Example 1. FIG. 1B, FIG. 1C, FIG. 1D, and FIG. 1E are aberration diagrams of the imaging optical system according to Example 1.

As illustrated in FIG. 1A, the imaging optical system according to Example 1 includes, in order from the object side, a first lens unit G1 having a negative refractive power, a second lens unit G2 having a positive refractive power, a third lens unit G3 having a positive refractive power, a fourth lens unit G4 having a positive refractive power, and a fifth lens unit G5 having a negative refractive power. The second lens unit G2 includes an aperture stop S.

The first lens unit G1 includes a negative meniscus lens L1 having a convex surface facing the object side, a negative meniscus lens L2 having a convex surface facing the object side, a negative meniscus lens L3 having a convex surface facing the image side, a biconvex positive lens L4, a biconvex positive lens L5, and a biconcave negative lens L6. Here, the biconvex positive lens L5 and the biconcave negative lens L6 are cemented together.

The second lens unit G2 includes a biconcave negative lens L7, a biconvex positive lens L8, and a biconvex positive lens L9. Here, the biconcave negative lens L7 and the biconvex positive lens L8 are cemented together.

The third lens unit G3 includes a positive meniscus lens L10 having a convex surface facing the object side, a biconvex positive lens L11, a biconcave negative lens L12, and a biconcave negative lens L13. Here, the biconvex positive lens L11 and the biconcave negative lens L12 are cemented together.

The fourth lens unit G4 includes a biconvex positive lens L14.

The fifth lens unit G5 includes a negative meniscus lens L15 having a convex surface facing the image side.

Here, the first lens unit G1 is a predetermined lens unit. Furthermore, the biconvex positive lens L5 and the biconcave negative lens L6 constitute a first cemented lens. Furthermore, the biconcave negative lens L7 and the biconvex positive lens L8 constitute a second cemented lens. Furthermore, the biconvex positive lens L11 and the biconcave negative lens L12 constitute a third cemented lens.

Furthermore, at a time of focusing from an object at infinity to an object at a close distance, the positive meniscus lens L10, the biconvex positive lens L11, the biconcave negative lens L12, and the biconcave negative lens L13 move integrally along the optical axis toward the object side, and the biconvex positive lens L14 moves along the optical axis toward the object side.

Aspheric surfaces are provided on five surfaces in total, namely, both surfaces of the negative meniscus lens L2, both surfaces of the positive meniscus lens L10, and the image-side surface of the biconcave negative lens L13.

Next, an imaging optical system according to Example 2 will be described. FIG. 2A is a lens sectional view of the imaging optical system according to Example 2. FIG. 2B, FIG. 2C, FIG. 2D, and FIG. 2E are aberration diagrams of the imaging optical system according to Example 2.

As illustrated in FIG. 2A, the imaging optical system according to Example 2 includes, in order from the object side, a first lens unit G1 having a negative refractive power, a second lens unit G2 having a positive refractive power, a third lens unit G3 having a positive refractive power, a fourth lens unit G4 having a positive refractive power, and a fifth lens unit G5 having a negative refractive power. The second lens unit G2 includes an aperture stop S.

The first lens unit G1 includes a negative meniscus lens L1 having a convex surface facing the object side, a biconcave negative lens L2, a biconvex positive lens L3, a biconvex positive lens L4, and a biconcave negative lens L5. Here, the biconcave negative lens L2 and the biconvex positive lens L3 are cemented together. The biconvex positive lens L4 and the biconcave negative lens L5 are also cemented together.

The second lens unit G2 includes a biconcave negative lens L6, a biconvex positive lens L7, and a biconvex positive lens L8. Here, the biconcave negative lens L6 and the biconvex positive lens L7 are cemented together.

The third lens unit G3 includes a positive meniscus lens L9 having a convex surface facing the object side, a biconvex positive lens L10, a biconcave negative lens L11, and a biconcave negative lens L12. Here, the biconvex positive lens L10 and the biconcave negative lens L11 are cemented together.

The fourth lens unit G4 includes a biconvex positive lens L13.

The fifth lens unit G5 includes a negative meniscus lens L14 having a convex surface facing the image side.

Here, the first lens unit G1 is a predetermined lens unit. Furthermore, the biconvex positive lens L4 and the biconcave negative lens L5 constitute a first cemented lens. Furthermore, the biconcave negative lens L6 and the biconvex positive lens L7 constitute a second cemented lens. Furthermore, the biconvex positive lens L10 and the biconcave negative lens L11 constitute a third cemented lens.

Furthermore, at a time of focusing from an object at infinity to an object at a close distance, the positive meniscus lens L9, the biconvex positive lens L10, the biconcave negative lens L11, and the biconcave negative lens L12 move integrally along the optical axis toward the object side, and the biconvex positive lens L13 moves along the optical axis toward the object side.

Aspheric surfaces are provided on five surfaces in total, namely, both surfaces of the negative meniscus lens L1, both surfaces of the positive meniscus lens L9, and the image-side surface of the biconcave negative lens L12.

Next, numerical data of optical components comprising the imaging optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, ν1, νd2, . . . denotes an Abbe number of each lens, * denotes an aspheric surface. Moreover, in various data, f denotes a focal length of an imaging optical system as a whole, FNO. denotes an F number, co denotes a half angle of view, IH denotes an image height, FB denotes a back focus, LTL denotes a lens total length. The lens total length is the distance from the frontmost lens surface to the rearmost lens surface plus back focus. The back focus is a unit which is expressed upon air conversion of a distance from the lens backmost surface to a paraxial image surface. Moreover, the unit of angle is ° (degree). Moreover, Infinity indicates the time of focusing to an object at infinity and Close distance indicates the time of focusing to an object at a close distance. Moreover, values in a column of close distance are distance from the object to the image.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)/r)^2\}^{1/2}]+A4y^4+A6y^6+A8y^8+A10y^{10}$$

Further, in the aspherical surface coefficients, 'e–n' (where, n is an integral number) indicates '$10^{-n}$'. Moreover, these symbols are commonly used in the following numerical data for each example.

Example 1

| | Unit mm | | | |
|---|---|---|---|---|
| | Surface data | | | |
| Surface no. | r | d | nd | νd |
| Object plane | ∞ | ∞ | | |
| 1 | 80.982 | 1.55 | 1.48749 | 70.23 |
| 2 | 31.093 | 11.04 | | |
| 3* | 70.066 | 2.06 | 1.49700 | 81.61 |
| 4* | 23.874 | 20.90 | | |
| 5 | −44.198 | 2.00 | 1.58267 | 46.42 |
| 6 | −364.034 | 0.41 | | |
| 7 | 121.274 | 10.00 | 1.84666 | 23.78 |
| 8 | −143.318 | 4.33 | | |
| 9 | 53.195 | 8.29 | 1.69680 | 55.53 |
| 10 | −49.889 | 1.51 | 1.80518 | 25.42 |
| 11 | 231.869 | 5.78 | | |
| 12 | −45.268 | 1.52 | 1.69895 | 30.13 |
| 13 | 46.454 | 8.54 | 1.49700 | 81.61 |
| 14 | −77.694 | 0.40 | | |
| 15 | 90.149 | 8.00 | 1.84666 | 23.78 |
| 16 | −78.759 | 1.20 | | |
| 17 (Stop) | ∞ | Variable | | |
| 18* | 29.688 | 9.46 | 1.49700 | 81.61 |
| 19* | 155.316 | 0.40 | | |
| 20 | 32.436 | 9.37 | 1.43875 | 94.93 |
| 21 | −61.296 | 1.50 | 1.64769 | 33.79 |
| 22 | 31.260 | 4.02 | | |
| 23 | −106.774 | 1.50 | 1.88202 | 37.22 |
| 24* | 543.118 | Variable | | |
| 25 | 54.280 | 12.50 | 1.43875 | 94.93 |
| 26 | −30.008 | Variable | | |
| 27 | −41.745 | 2.00 | 1.68893 | 31.07 |
| 28 | −130.259 | 6.91 | | |
| 29 | ∞ | 2.40 | 1.51633 | 64.14 |
| 30 | ∞ | 1.00 | | |
| Image plane | ∞ | | | |

Aspherical surface data

3rd surface k = 0.000
A4 = −5.73100e−07, A6 = 7.04995e−10, A8 = −1.97070e−13, A10 = 2.50300e−16

-continued

| Unit mm |
|---|

4th surface k = −0.552
18th surface k = 0.000
A4 = 8.41210e−07, A6 = −6.21950e−10, A8 = 2.00464e−12, A10 = −4.10109e−17
19th surface k = 0.000
A4 = −2.36410e−07, A6 = −7.81928e−09, A8 = 9.23546e−12, A10 = −3.63943e−15
24th surface k = 0.000
A4 = 2.16711e−05, A6 = 2.40883e−08, A8 = 5.51538e−11, A10 = −1.85095e−13

| Various data | |
|---|---|
| f | 24.48 |
| FNO. | 1.41 |
| 2ω | 91.37 |
| IH | 22.50 |
| FB (in air) | 9.49 |
| LTL (in air) | 154.18 |

| | Infinity | Close distance (145 mm) |
|---|---|---|
| d17 | 6.06 | 3.30 |
| d24 | 4.81 | 4.50 |
| d26 | 5.54 | 8.61 |

Unit focal length f1 = −172.31   f2 = 97.49   f3 = 412.37   f4 = 46.13   f5 = −90.00

Example 2

| | Unit mm | | | |
|---|---|---|---|---|
| | Surface data | | | |
| Surface no. | r | d | nd | νd |
| Object plane | ∞ | ∞ | | |
| 1* | 72.832 | 2.06 | 1.51633 | 64.14 |
| 2* | 33.439 | 16.38 | | |
| 3 | −53.919 | 2.00 | 1.64769 | 33.79 |
| 4 | 83.979 | 8.11 | 2.00069 | 25.46 |
| 5 | −107.153 | 1.97 | | |
| 6 | 58.391 | 11.82 | 1.69680 | 55.53 |
| 7 | −43.427 | 1.50 | 1.74077 | 27.79 |
| 8 | 97.492 | 10.12 | | |
| 9 | −40.473 | 1.50 | 1.69895 | 30.13 |
| 10 | 82.697 | 8.74 | 1.43875 | 94.93 |
| 11 | −70.821 | 0.76 | | |
| 12 | 221.816 | 8.63 | 1.84666 | 23.78 |
| 13 | −65.844 | 1.20 | | |
| 14 (Stop) | ∞ | Variable | | |
| 15* | 35.187 | 12.00 | 1.49700 | 81.61 |
| 16* | 157.338 | 0.44 | | |
| 17 | 32.095 | 12.00 | 1.43875 | 94.93 |
| 18 | −270.555 | 2.59 | 1.64769 | 33.79 |
| 19 | 37.108 | 4.29 | | |
| 20 | −140.818 | 2.00 | 1.88202 | 37.22 |
| 21* | 282.542 | Variable | | |
| 22 | 178.092 | 5.96 | 1.65160 | 58.55 |
| 23 | −63.320 | Variable | | |
| 24 | −50.420 | 2.00 | 1.84666 | 23.78 |
| 25 | −126.917 | 13.95 | | |
| 26 | ∞ | 2.40 | 1.51633 | 64.14 |

-continued

Unit mm

| 27 | ∞ | 1.00 |
| Image plane | ∞ | |

Aspherical surface data

1st surface k = 0.000
A4 = 1.16574e−06, A6 = −1.51769e−09, A8 = 1.19325e−12

2nd surface k = 0.000
A4 = 7.45073e−07, A6 = −1.98214e−09, A8 = 5.16275e−13

15th surface k = 0.000
A4 = 1.21497e−06, A6 = 3.62905e−10, A8 = 1.07171e−12

16th surface k = 0.000
A4 = 1.75742e−07, A6 = −1.99527e−09, A8 = 5.36732e−13

21th surface k = 0.000
A4 = 1.26443e−05, A6 = 1.21726e−08, A8 = 1.20869e−11,
A10 = 2.14183e−14

Various data

| f | 49.00 |
| FNO. | 1.41 |
| 2ω | 48.78 |
| IH | 22.50 |
| FB (in air) | 16.53 |
| LTL (in air) | 154.18 |

| | Infinity | Close distance (295 mm) |
|---|---|---|
| d14 | 12.67 | 3.30 |
| d21 | 4.50 | 10.72 |
| d23 | 4.43 | 7.58 |

Unit focal length f1 = −1257.02   f2 = 158.49   f3 = 170.47   f4 = 72.39   f5 = −100.00

Next, values of conditional expressions (1) to (7) and (A) to (C) in each example are given below.

| Conditional expression | Example 1 | Example 2 |
|---|---|---|
| (1) $M_{5\_3G}/M_{5\_4G}$ | 0.927 | 0.537 |
| (2) $(R_{2GF} + R_{2GR})/(R_{2GF} - R_{2GR})$ | −3.703 | −4.191 |
| (3) $(R_{P1F} + R_{P1R})/(R_{P1F} - R_{P1R})$ | 0.067 | 0.542 |
| (4) $(R_{5GF} + R_{5GR})/(R_{5GF} - R_{5GR})$ | −1.943 | −2.318 |
| (5) $(R_{P2F} + R_{P2R})/(R_{P2F} - R_{P2R})$ | 0.288 | 0.475 |
| (6) $(R_{N1F} + R_{N1R})/(R_{N1F} - R_{N1R})$ | 2.247 | 2.698 |
| (7) $D_{3G}/D_{4G}$ | 0.899 | 2.972 |
| (A) $f/e_{N1F}$ | 0.366 | 0.913 |
| (B) $(f/e_{AS})/Fno$ | 0.40 | 0.67 |
| (C) $T_{air\_max}/\Sigma d$ | 0.14 | 0.12 |

The optical apparatus of the present embodiment includes an image pickup apparatus and a projection apparatus. Concrete examples of the image pickup apparatus and the projection apparatus will be described below.

Figure 3:
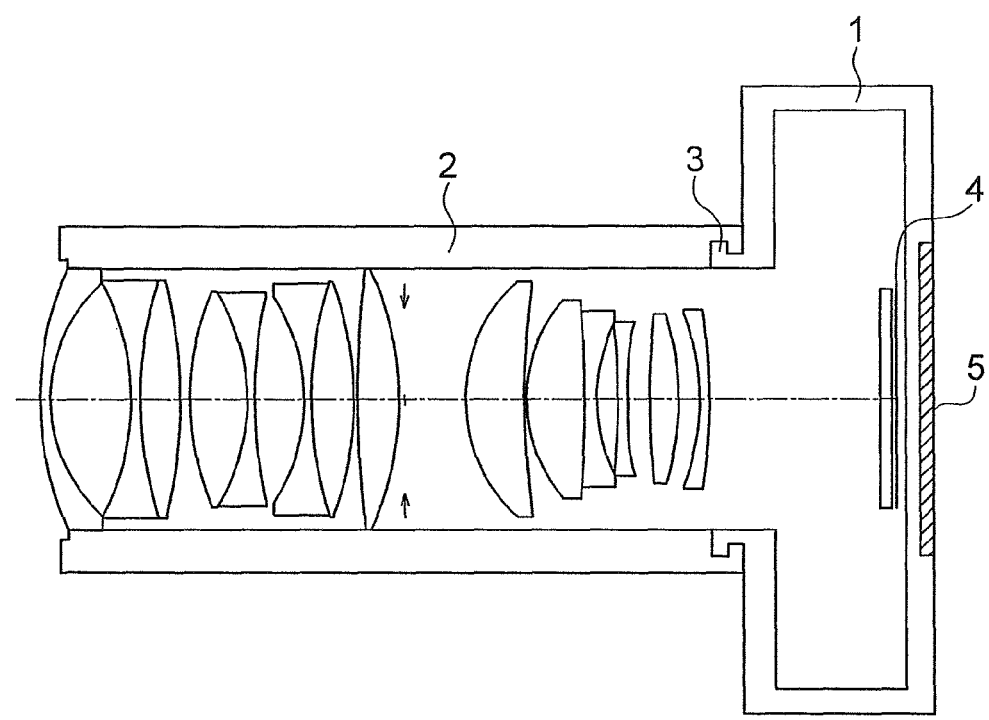
FIG. 3 is a cross-sectional view of an image pickup apparatus.

FIG. 3 is a cross-sectional view of a single-lens mirrorless camera as an electronic image pickup apparatus. In FIG. 3, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the imaging optical system described in first example and the second example is to be used.

Figure 4:
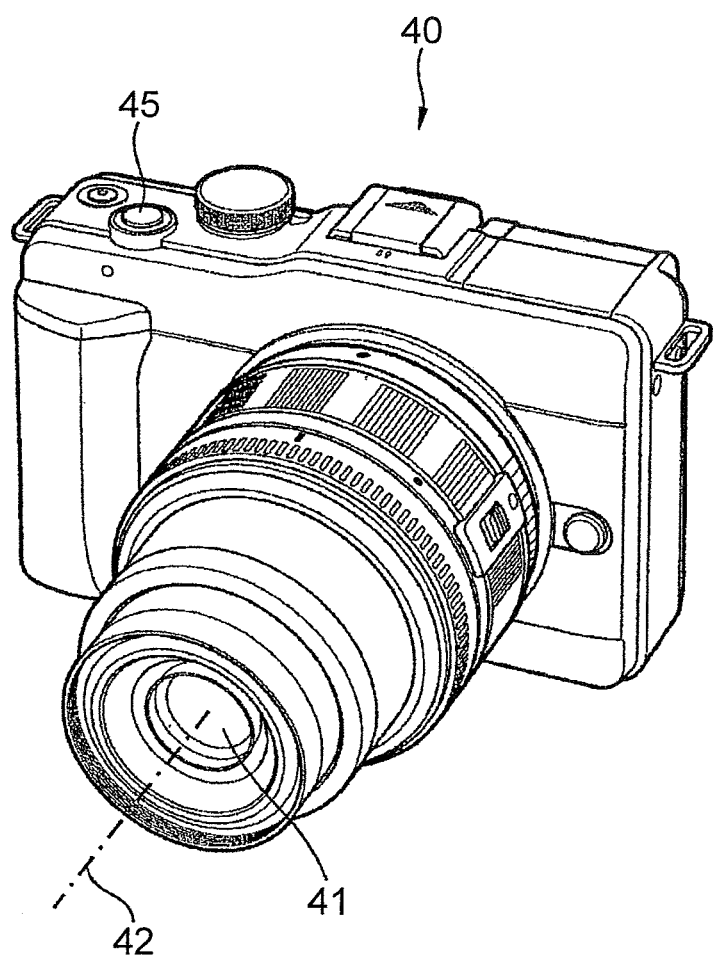
FIG. 4 is a front perspective view illustrating the appearance of the image pickup apparatus.
Figure 5:
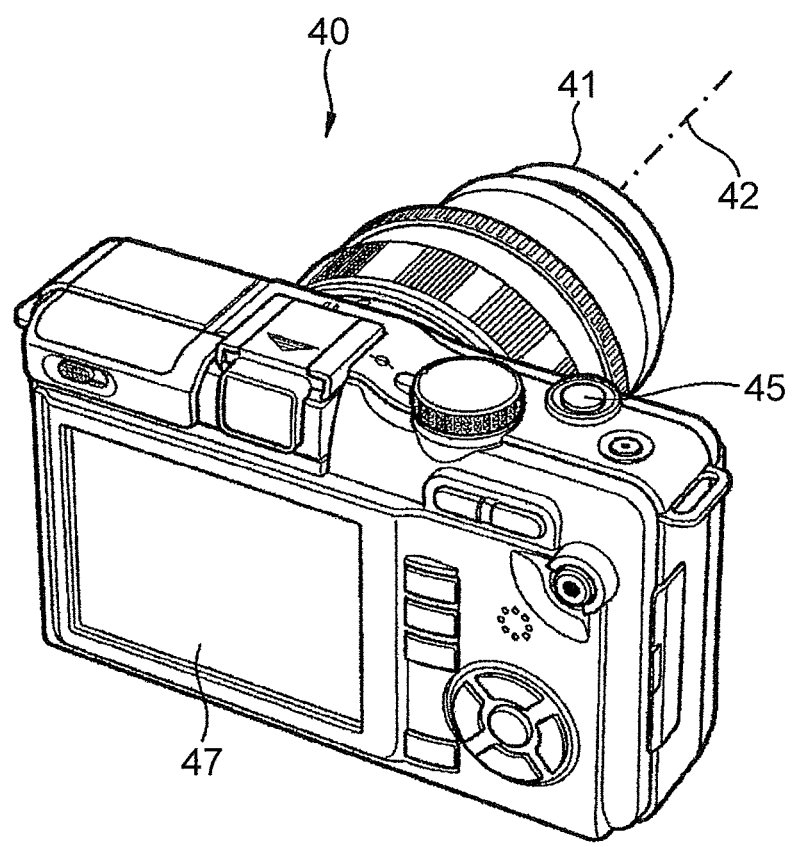
FIG. 5 is a rear perspective view of the image pickup apparatus.

FIG. 4 and FIG. 5 are conceptual diagrams of an arrangement of the image pickup apparatus. FIG. 4 is a front perspective view of a digital camera 40 as the image pickup apparatus, and FIG. 5 is a rear perspective view of the digital camera 40. The imaging optical system shown first example or the second example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the imaging optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 6:
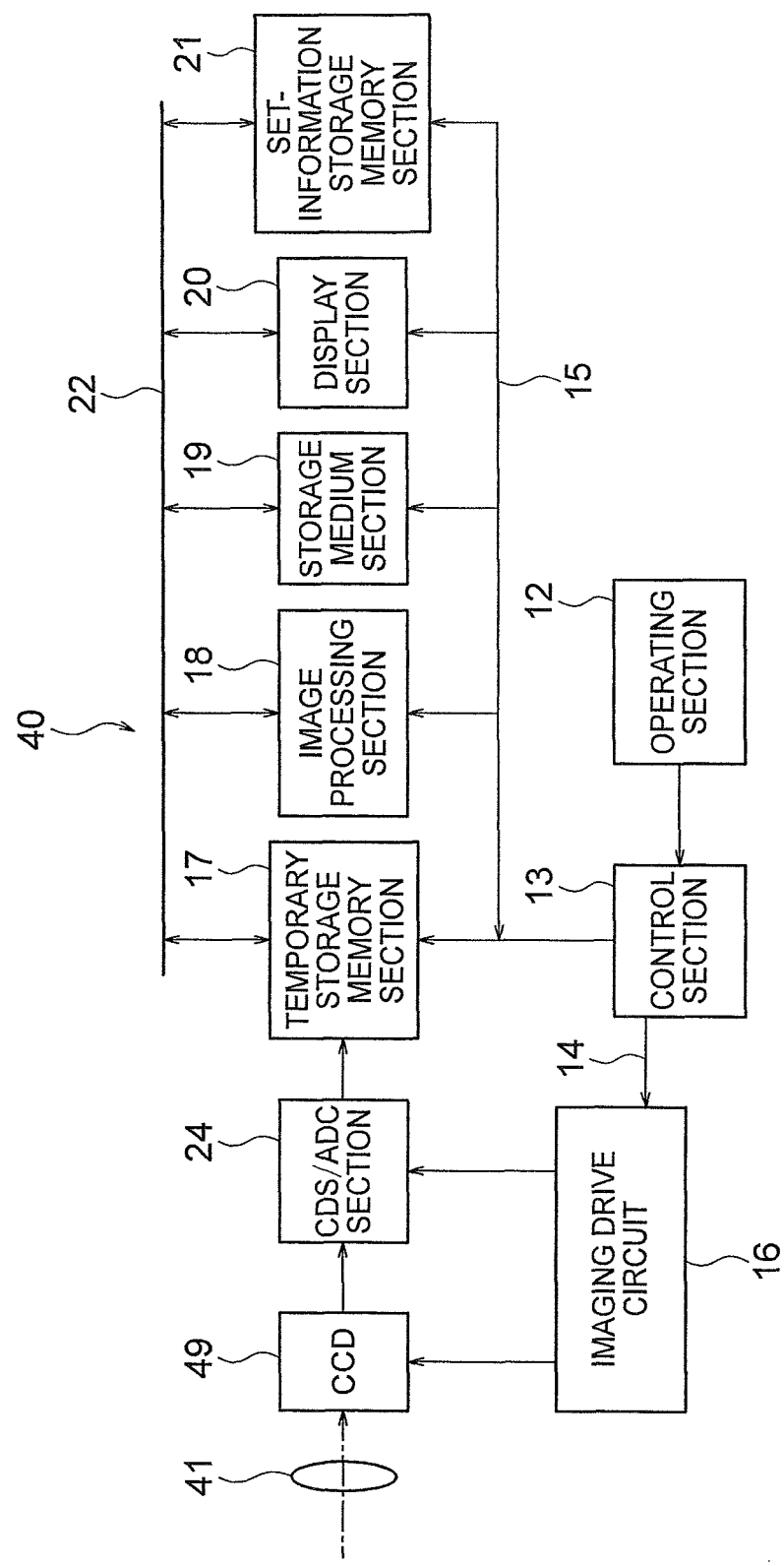
FIG. 6 is a structural block diagram showing an internal circuit of main components of the image pickup apparatus.

FIG. 6 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 6, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 in which such an arrangement is made, by adopting the imaging optical system according to the present invention as the photographing optical system 41, it is possible to capture an image in a wide photography range with low noise at high resolution. Moreover, it is possible to use the imaging optical system according to the present invention in an image pickup apparatus of a type having a quick-return mirror.

Figure 7:
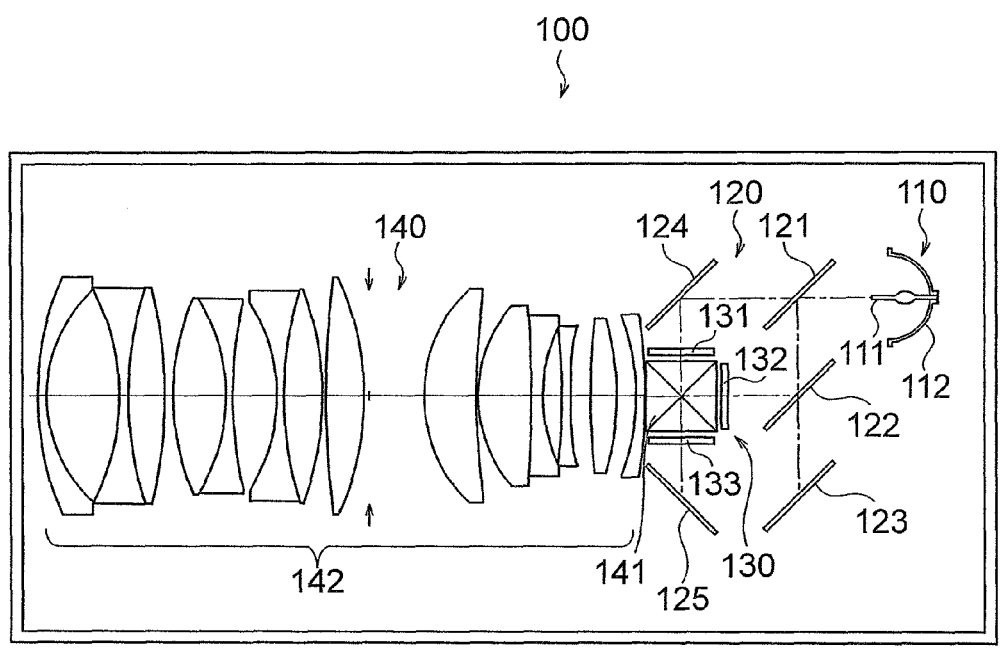
FIG. 7 is a sectional view of a projection apparatus.

FIG. 7 is a sectional view of a projector as a projection apparatus. As illustrated in FIG. 7, a projector 100 includes a light source unit 110, an illumination unit 120, an image forming unit 130, and a projection unit 140.

The light source unit 110 includes a light source 111 and a reflective member 112. Illumination light is emitted from the light source 111. The illumination light is white light. The illumination light is reflected by the reflective member 112 and enters the illumination unit 120.

The illumination unit 120 includes a first dichroic mirror 121, a second dichroic mirror 122, a third dichroic mirror 123, a first reflective member 124, and a second reflective member 125.

In the first dichroic mirror 121, light in the red wavelength range (hereinafter referred to as "red light") is transmitted, and light in the other wavelength ranges is reflected. In the second dichroic mirror 122, light in the green wavelength range (hereinafter referred to as "green light") is reflected, and light in the other wavelength ranges is transmitted. In the third dichroic mirror 123, light in the blue wavelength range (hereinafter referred to as "blue light") is reflected, and light in the other wavelength ranges is transmitted. The red light, the green light, and the blue light enter the image forming unit 130. A general plane reflector may be used instead of the third dichroic mirror 123.

The image forming unit 130 has a first display element 131, a second display element 132, and a third display element 133.

The first display element 131 is irradiated with red light through the first reflective member 124. The second display element 132 is irradiated with green light. The third display element 133 is irradiated with blue light through the second reflective member 125.

Here, an identical image is displayed on the first display element 131, the second display element 132, and the third display element 133. Thus, a red image is displayed on the first display element 131, a green image is displayed on the second display element 132, and a blue image is displayed on the third display element 133.

Lights emitted from the first display element 131, the second display element 132, and the third display element 133 enter the projection unit 140.

The projection unit 140 includes a dichroic prism 141 and a projection optical system 142.

Lights emitted from the first display element 131, the second display element 132, and the third display element 133 are combined in the dichroic prism 141. As described above, a red image, a green image, and a blue image are displayed in the image forming unit 130. The three images are combined by the dichroic prism 141.

The projection optical system 142 projects the combined three images to a predetermined position. For example, the imaging optical system illustrated in Examples 1 or 2 above is used for this projection optical system 142.

The image forming unit 130 may be a light valve such as a digital micromirror device (DMD). In this case, light from the light source unit 110 is reflected by the light valve, and the image from the light valve is magnified and projected by the projection unit 140.

In the projector 100 thus configured, the imaging optical system of the present invention is employed as the projection optical system 142, whereby it is possible to project an image in a wide projection range with low noise at high resolution.

According to the present invention, it is possible to provide an imaging optical system in which various aberrations are corrected favorably while having a wide angle of view and a small F-number yet satisfactorily, and an optical apparatus including the same.

As described above, the imaging optical system according to the present invention is suitable for an imaging optical system in which various aberrations are corrected favorably while having a wide angle of view and a small F-number yet satisfactorily. Furthermore, the optical apparatus according to the present invention is suitable for an image pickup apparatus for capturing an image in a wide photography range with low noise at high resolution and for a projection apparatus for projecting an image in a wide projection range with low noise at high resolution.

What is claimed is:

1. An imaging optical system configured to form a conjugate relation between a conjugate point on an enlargement side having a long distance and a conjugate point on a reduction side having a short distance,
the imaging optical system comprising:
in order from the enlargement side,
a first lens unit having a negative refractive power;
a second lens unit having a positive refractive power;

a third lens unit having a positive refractive power;
a fourth lens unit; and
a fifth lens unit,
wherein
an aperture stop is included in the second lens unit,
the first lens unit includes a first negative lens positioned closest to the enlargement side and a first cemented lens positioned closest to a reduction side,
the second lens unit includes, in order from the enlargement side, a second cemented lens and at least one positive lens component,
the third lens unit includes, in order from the enlargement side, at least one positive lens component and a third cemented lens,
the lens component is a lens block in which an enlargement-side surface and a reduction-side surface alone are in contact with air in an optical path,
the first cemented lens includes a negative lens closest to a reduction side and has a surface closest to the reduction side having a concave surface facing the reduction side,
the second cemented lens has a positive refractive power and has a surface closest to the enlargement side having a concave surface facing the enlargement side, and
the third cemented lens includes a positive refractive power and has a negative lens on the reduction side.

2. The imaging optical system according to claim 1, wherein
following Conditional Expression (1) is satisfied:

$$0.1 < M_{5\_3G}/M_{5\_4G} < 5 \tag{1}$$

where
$M_{5\_3G}$ is a lateral magnification of the third lens unit at a time of focusing to an object at infinity; and
$M_{5\_4G}$ is a lateral magnification of the fourth lens unit at the time of focusing to the object at infinity.

3. The imaging optical system according to claim 1, wherein
following Conditional Expression (2) is satisfied:

$$-10 < (R_{2GF}+R_{2GR})/(R_{2GF}-R_{2GR}) < -0.1 \tag{2}$$

where
$R_{2GF}$ is a paraxial radius of curvature of a surface positioned closest to the enlargement side in the second lens unit; and
$R_{2GR}$ is a paraxial radius of curvature of a surface positioned closest to the reduction side in the second lens unit.

4. The imaging optical system according to claim 1, wherein
first positive lens positioned closest to the second cemented lens is included, and
following Conditional Expression (3) is satisfied:

$$0.001 < (R_{P1F}+R_{P1R})/(R_{P1F}-R_{P1R}) < 5 \tag{3}$$

where
$R_{P1F}$ is a paraxial radius of curvature of an enlargement-side surface of the first positive lens; and
$R_{P1R}$ is a paraxial radius of curvature of a reduction-side surface of the first positive lens.

5. The imaging optical system according to claim 1, wherein an air space in a range from the third lens unit to the fifth lens unit changes at a time of focusing.

6. The imaging optical system according to claim 1, wherein
following Conditional Expression (4) below is satisfied:

$$-8 < (R_{5GF}+R_{5GR})/(R_{5GF}-R_{5GR}) < -0.1 \tag{4}$$

where
$R_{5GF}$ is a paraxial radius of curvature of a surface positioned closest to the enlargement side in the fifth lens unit; and
$R_{5GR}$ is a paraxial radius of curvature of a surface positioned closest to the reduction side in the fifth lens unit.

7. The imaging optical system according to claim 1, wherein
the fourth lens unit includes one lens,
the one lens is a second positive lens, and
following Conditional Expression (5) is satisfied:

$$0.01 < (R_{P2F}+R_{P2R})/(R_{P2F}-R_{P2R}) < 2 \tag{5}$$

where
$R_{P2F}$ is a paraxial radius of curvature of an enlargement-side surface of the second positive lens; and
$R_{P2R}$ is a paraxial radius of curvature of a reduction-side surface of the second positive lens.

8. The imaging optical system according to claim 1, wherein the first negative lens is a meniscus lens.

9. The imaging optical system according to claim 1, wherein
following Conditional Expression (6) is satisfied:

$$0.1 < (R_{N1F}+R_{N1R})/(R_{N1F}-R_{N1R}) < 6 \tag{6}$$

where
$R_{N1F}$ is a paraxial radius of curvature of an enlargement-side surface of the first negative lens; and
$R_{N1R}$ is a paraxial radius of curvature of a reduction-side surface of the first negative lens.

10. The imaging optical system according to claim 1, wherein
the third lens unit includes a negative lens component closer to the reduction side than the third cemented lens is,
the fourth lens unit has a positive refractive power and includes a positive lens component, and
the fifth lens unit has a negative refractive power and includes a negative lens component.

11. The imaging optical system according to claim 1, wherein
following Conditional Expression (7) is satisfied:

$$0.1 < D_{3G}/D_{4G} < 4.5 \tag{7}$$

where
$D_{3G}$ is an amount of movement of the third lens unit at a time of focusing; and
$D_{4G}$ is an amount of movement of the fourth lens unit at the time of focusing.

12. The imaging optical system according to claim 1, wherein
the third lens unit comprises, in order from the enlargement side, the positive lens component, the third cemented lens, and a negative lens component,
the third cemented lens comprises, in order from the enlargement side, a positive lens and the negative lens, and
a shape of the negative lens component in the third lens unit is a biconcave shape.

13. The imaging optical system according to claim 1, wherein
following Conditional Expression (A) is satisfied:

$$0 < f/e_{N1F} < 2 \tag{A}$$

where
f is a focal length of the imaging optical system as a whole at a time of focusing to an object at infinity; and $e_{N1F}$ is a maximum effective aperture of an enlargement-side surface of the first negative lens.

14. The imaging optical system according to claim 1, wherein
following Conditional Expression (3) is satisfied:

$$0 < (f/e_{AS})/Fno < 2 \quad (B),$$

where
f is a focal length of the imaging optical system as a whole at a time of focusing to an object focusing at infinity;
$e_{AS}$ is a maximum diameter of the aperture stop; and
Fno is an F-number of the imaging optical system as a whole at the time of focusing to the object focusing at infinity.

15. The imaging optical system according to claim 1, wherein
following Conditional Expression (C) is satisfied:

$$0 < T_{air\_max}/\Sigma d < 0.27 \quad (C),$$

where
$T_{air\_max}$ is a largest axial air space in a range from a surface positioned closest to the enlargement side to a surface positioned closest to the reduction side in the imaging optical system; and
$\Sigma d$ is an axial distance from the surface positioned closest to the enlargement side to the surface positioned closest to the reduction side in the imaging optical system.

16. An optical apparatus comprising:
an optical system; and
an image pickup element arranged on a reduction side, wherein
the image pickup element has an image pickup surface and converts an image formed on the image pickup surface by the optical system into an electrical signal, and
the optical system is the imaging optical system of claim 1.

17. An optical apparatus comprising:
an optical system; and
a display element arranged on a reduction side, wherein
the display element has a display surface,
an image displayed on the display surface is projected toward an enlargement side by the optical system, and
the optical system is the imaging optical system of claim 1.

18. The imaging optical system according to claim 1, wherein
at a time of focusing,
a distance between the second lens unit and the third lens unit,
a distance between the third lens unit and the fourth lens unit, and
a distance between the fourth lens unit and the fifth lens unit change.

19. The imaging optical system according to claim 1, wherein
the aperture stop is arranged closest to the reduction side in the second lens unit,
the fourth lens unit comprises one lens component, and
the fifth lens unit comprises one lens component.

20. The imaging optical system according to claim 1, wherein
at a time of focusing,
the third lens unit moves, and
a distance between the third lens unit and the fourth lens unit and
a distance between the fourth lens unit and the fifth lens unit change.

* * * * *

UNITED STATES PATENT AND TRADEMARK OFFICE
CERTIFICATE OF CORRECTION

PATENT NO. : 9,952,416 B2
APPLICATION NO. : 15/391918
DATED : April 24, 2018
INVENTOR(S) : Keisuke Ichikawa Page 1 of 1

It is certified that error appears in the above-identified patent and that said Letters Patent is hereby corrected as shown below:

Column 2, Line 17, delete "forma" and insert --form a--.

Column 6, Line 51, delete "(1)" and insert --(1),--.

Column 7, Line 30, delete "(1° ')" and insert --(1")--.

Column 7, Line 33, delete "(1")" and insert --(1").--.

Column 8, Line 9, delete "(2')" and insert --(2').--.

Column 8, Line 13, delete "(2")" and insert --(2").--.

Column 8, Line 55, delete "(3')" and insert --(3').--.

Column 9, Line 40, delete "(4)." and insert --(4),--.

Column 10, Line 8, delete "Expression)" and insert --Expression--.

Column 10, Line 21, delete "(5)" and insert --(5),--.

Column 13, Line 16, delete "(B)." and insert --(B),--.

Column 14, Line 9, delete "0.07<Tair_maxΣd≤0.16" and insert --0.07<Tair_max/Σd≤0.16--.

Column 17, Line 19 and 20, delete "Z=(y2/r)/[1+{1-(1+k)/r)2}1/2]+A4y4+A6y6+A8y8+A10y10" and insert --Z=(y2/r)/[1+{1-(1+k)(y/r)2}1/2]+A4y4+A6y6+A8y8+A10y10--.

Signed and Sealed this
Twenty-eighth Day of August, 2018

Andrei Iancu
*Director of the United States Patent and Trademark Office*